SURFACE IONIZATION APPARATUS AND ELECTRODE MEANS FOR ACCELERATING THE IONS IN A CURVED PATH

Filed May 16, 1967

George R. Brewer,
Douglas M. Jamba,
Robert G. Wilson,
INVENTORS.
BY
W. H. MacAllister Jr.
ATTORNEY.

George R. Brewer,
Douglas M. Jamba,
Robert G. Wilson,
INVENTORS.
BY.
W. H. MacAllister Jr.
ATTORNEY.

United States Patent Office 3,479,545
Patented Nov. 18, 1969

3,479,545
SURFACE IONIZATION APPARATUS AND ELECTRODE MEANS FOR ACCELERATING THE IONS IN A CURVED PATH

Robert G. Wilson, Canoga Park, George R. Brewer, Malibu, and Douglas M. Jamba, Woodland Hills, Calif., assignors to Hughes Aircraft Company, Culver City, Calif., a corporation of Delaware Filed May 16, 1967, Ser. No. 640,441
Int. Cl. H01j *39/34;* H05h *7/08*
U.S. Cl. 313—63 4 Claims

ABSTRACT OF THE DISCLOSURE

An ion beam forming apparatus comprising an atomic beam generator, a surface ionizing element on which the ion beam impinges and whereby the atoms in said beam are ionized, and an electrode system adjacent the ionizing surface for establishing an electric field having a predetermined arrangement of equipotential force lines to cause the ion beam formed to follow a curved path away from the ionizing surface.

Figure 3:
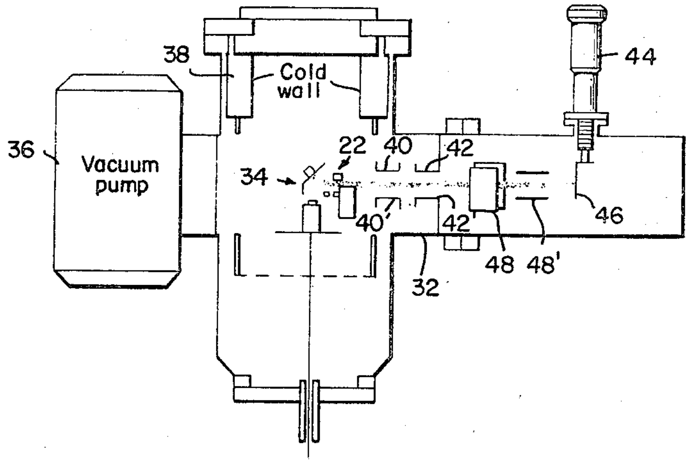

This invention relates to ion sources and, more particularly, to apparatus and methods for forming ion beams. The invention is particularly useful in the fabrication of semiconductor devices where it is desired to precisely incorporate or implant certain conductivity type-determining impurities in a semiconductor body.

Such fabrication of semiconductor devices by the process of ion implantation is known and is disclosed, for example, in the copending application of R. W. Bower, entitled "Field Effect Device With Insulated Gate," Ser. No. 590,033, filed Oct. 27, 1966. As taught in this copending application, what is ultimately required in fabricating many semiconductor devices is the incorporation in a semiconductor body of atoms capable of establishing the desired type of conductivity. In the conventional diffusion process for achieving this purpose, a supply of atoms capable of establishing the requisite conductivity is usually provided in the vapor phase of the impurity or dopant material and is not controllable except by thermodynamic techniques. In effect, the atoms in a diffusion process tend to drift into contact with the exposed surface of a semiconductor surface body and continue to drift into the crystal lattice structure of the semiconductor body in a more or less random fashion in accordance with thermodynamic principles.

In an ion implantation process, the impurity or dopant atoms acquire a predetermined electrical charge and thereafter are said to be ionized and are referred to as ions. By means of electric and/or magnetic fields, these ions may then be formed into beams of various cross-sectional diameters and shapes and also may be caused to travel in predetermined directions much like the electrons in an electron beam. Therefore, instead of drifting in the lattice structure of a semiconductor body in randomly distributed directions and densities, ions may be made to enter the lattice in a predetermined direction and may be positioned where desired therein. In addition, the concentration of such impurities in the semiconductor body may be controlled and the distribution may be made uniform or graded throughout the implanted region as desired. While the invention has particular utility in the fabrication of semiconductor devices by ion implantation, it will be expressly understood that it is by no means limited to such use.

As indicated previously, the present invention is concerned with the formation or generation of a beam of ions. Apparatus is known for forming ion beams and ion beam generation has been achieved by several techniques or phenomena. In one prior art technique referred to as "electron bombardment," a stream of electrons generated from a cathode is caused to approach an anode, usually by tortuous or spiral trajectories. A vapor of the material to be ionized is introduced into the anode and cathode space, whereupon the impact between the electrons and the atoms of the gas results in the ionization of the gas atoms which are thereafter extracted from the plasma between the anode and cathode by an electrode having an appropriate potential thereon.

The technique of the present invention for producing a supply of ions is referred to herein as surface ionization. In general, this process depends upon causing atoms of a material in the vapor phase to impinge upon a hot surface whereupon each atom either gains or loses an electron to or from the surface so that the atom acquires either a positive or a negative charge. Electrons are lost to this surface if the work function of the surface is high with respect to the ionization potential of the impinging atom. Electrons are gained if the surface work function is low with respect to the electron affinity of the impinging atom. Prior ion sources, while capable of generating ion beams, were not designed to remove "neutral," meaning atoms which are not ionized. Neither were the ion sources of the prior art capable of bending ion beams while maintaining uniform current density and parallel ion trajectories. The ion beam apparatus of the invention is capable of readily permitting a change in the species of the ions being produced. In addition, prior surface ionization sources often utilized porous refractory metals (e.g., tungsten) or oxygenated tungsten as the ionizing surface. These systems depended upon the presence of an electronegative gas such as oxygen to be incident upon the ionizing surface in order to maintain the requisite high surface work function. The presence of oxygen thus offered the opportunity for possible deleterious interaction with the ion source or the vacuum system or the targets being subjected to ion bombardment.

Another disadvantage of the prior art surface ionization sources was the necessity of depending on extraction and focussing electrode systems which were axially symmetrical with the ion beam produced.

It is therefore an object of the present invention to provide an improved ion beam apparatus of the surface ionization type.

Another object of the invention is to provide an improved ion source of the surface ionization type.

Another object of the invention is to provide an improved ion beam apparatus of the surface ionization type which is capable of forming an ion beam characterized by the absence of neutral atoms of the ion beam species and which beam is also marked by a high degree of parallelism in the ion beam trajectory.

Still another object of the invention is to provide an improved ion beam apparatus of the surface ionization type in which the ion species produced may be readily changed.

Another object of the invention is to provide an improved ion beam apparatus of the surface ionization type capable of forming ion beams of high energy.

Yet another object of the invention is to provide an improved source of the surface ionization type characterized by a higher ionization efficiency at the ionization surface and without the necessity of electronegative gas additives.

Still another object of the invention is to provide an improved ion source of the surface ionization type wherein ion beams of high purity are generated.

Yet another object of the invention is to provide an improved ion beam apparatus of the surface ionization type wherein ion beams produced can be controlled (deflected and focused).

These and other objects and advantages of the invention are realized by providing a surface ionization element in combination with an electrode system which establishes a predetermined pattern of equipotential lines of force which causes the ion beam to follow a preselected path having a principal axis which is at an angle of other than 90° with respect to the ionizing surface. Typically, the principal axis of the ion beam may be at an angle of 45°, for example, with respect to the surface of the ionizing element. Ionized atoms leaving from the ionizing surface element thus effect a 45° angle turn while neutral or un-ionized atoms will not be caused to follow this path by the electric field. Thus, un-ionized or neutral atoms will be separated from the desired ion species. Such neutral particles evaporate in a region adjacent the ionizing surface element. Their removal may be further enhanced by the employment of a "cold" wall (e.g., at liquid nitrogen temperature), particularly surrounding the ion source which results in the condensation of the evaporated neutral atoms or particles. According to the invention, and with the application of suitable potentials of the elecrodes in the ion source, a beam of about 1 centimeter in width can be extracted with up to 50 kev. or greater of energy because the source may be operated in an ultrahigh vacuum.

Figure 1:
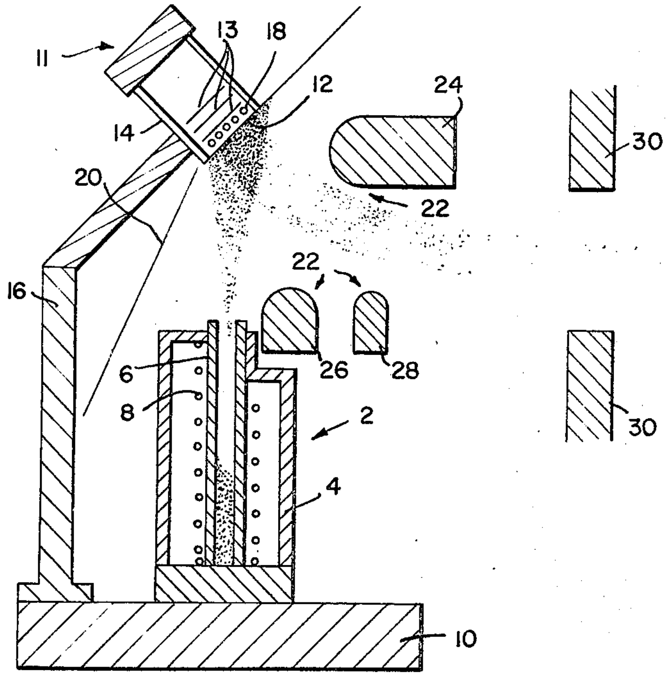
Figure 2:
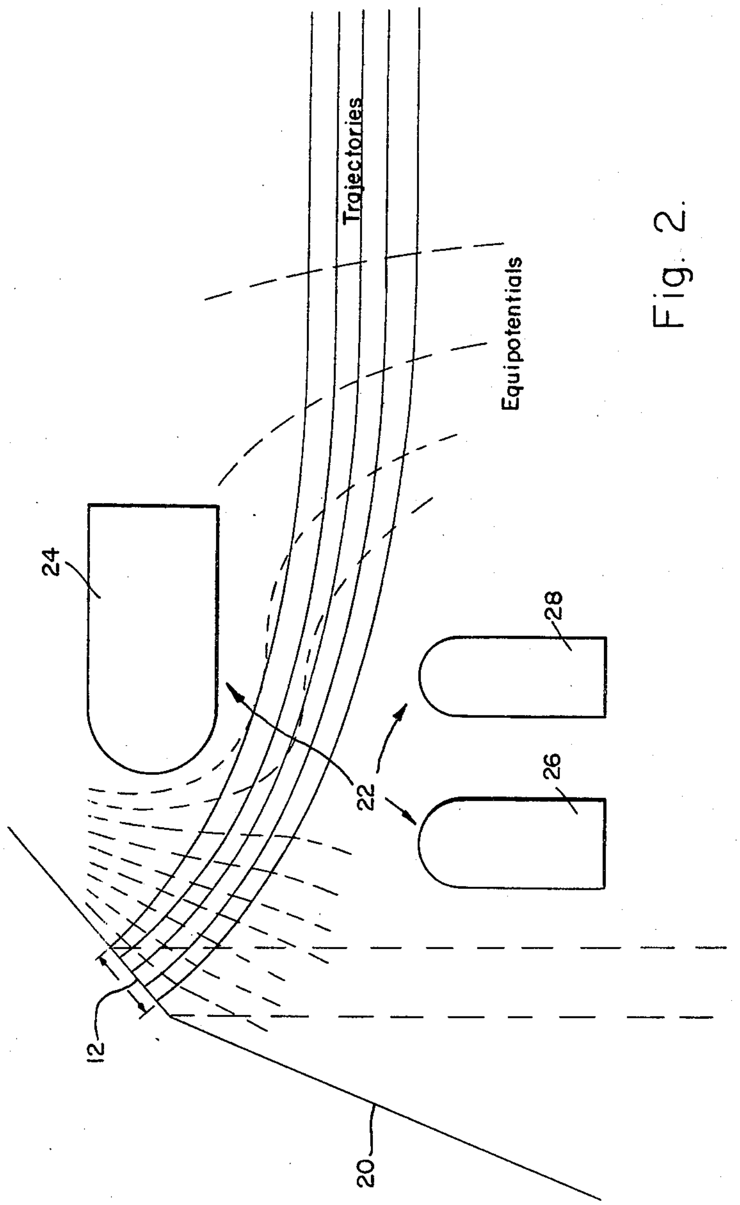

The invention will be described in greater detail by reference to the drawings in which:

FIGURE 1 is a partly schematic, partly cross-sectional and elevational ion source according to the invention;

FIGURE 2 is a schematic view of an ion beam source according to the invention and illustratively indicating the ion beam trajectories and paths as well as the equipotential lines of force constituting the electric field established adjacent the ionizing surface; and FIGURE 3 is a schematic view of apparatus in which the ion source of the invention is incorporated and which is useful for subjecting a predetermined target to the ion beam produced thereby.

Referring now to FIGURE 1, the essential elements of the ion source according to the invention comprise: (1) means for forming an atomic beam of the material which it is desired to form into a beam of ions, hereinafter called the atomic beam generator and which is usually adapted to heat and thereby vaporize the material to be ionized; and (2) an ionization element having an ionizing surface adapted to be heated and having a high work function. The vapor generator 2, sometimes also called the oven, may comprise a container 4 in which is disposed a second container or reentrant portion 6. The outer container 4 may advantageously be of metal having a high melting point and good heat reflecting properties. Typically, molybdenum is suitable for this purpose. The inner container or vapor reservoir 6 in which the material to be vaporized is disposed is preferably of aluminum oxide in as pure a form as possible. It has been found that some reactive materials, such as aluminum desired to be ionized, are difficult to contain at the required high temperatures without reaction with the material of the container 6. In addition to using aluminum oxide for the container or reservoir 6, beryllium oxide may also be employed. Disposed around the reservoir container 6 may be a heating element 8 in the form of a resistance heating coil, for example. It will be appreciated, however, that other means for heating the reservoir 6 may be employed to equal advantage. As shown, the heating means 8 is disposed around the reservoir 6 and within the outer container 4. The outer container 4 is disposed on any suitable platform 10 to which it may be affixed in order to facilitate the proper alignment with the ionizer.

Disposed above the mouth of the vapor reservoir 6 is an ionization assembly 11. While the ionization assembly 11 has been shown as being above the vapor reservoir, such vertical disposition is not essential; a side-by-side arrangement is equally operable providing means are utilized to keep any liquid material in the reservoir from flowing out or spilling. The ionization assembly 11 comprises a support or container 14 of high temperature material of good heat reflector properties across the mouth of which is mounted an ionizing surface or element 12 preferably formed of iridium foil. The container 14 in turn is affixed to a support 16 attached to the platform 10. As shown, the support member 16 is provided with a 45° bend so that the plane of the ionizing surface or iridium foil 12 is at an angle of 45° with respect to the mouth of the vapor reservoir 6 although there is nothing critical in the particular angular relationship chosen. All that is necessary is for the ionizing element 12 to be so disposed with respect to the vapor reservoir that the atomic beam issuing therefrom may effectively or efficiently reach and impinge on the surface 12. A heater 18, which may again be of the resistance coil type, is provided within the container 14 and adjacent the iridium foil 12 for the purpose of heating this foil to a predetermined temperature. Heating of the element 12 may also be accomplished by electron bombardment, if desired. It may also be advantageous to include foils such as 13 with good heat reflecting properties in the container 14 to enhance the heating of the ionizing element 12.

Disposed around the ionizing surface element 12 is a shielding electrode 20, the purpose of which is to cooperate with the electrode system 22 in the establishment of an electric field at the ionizing surface 12. This shielding electrode 20 may be in the form of a plate having an opening therein through which the ionizing element 12 is exposed. The shielding electrode 20 is also shown with a portion thereof angled to cooperate with the electrode system 22 in the establishment of the requisite electric field and particularly in achieving the desired pattern of field lines to achieve a 45° bending of the ion beam.

The electrode system 22 comprises three bar electrode members 24, 26 and 28, one edge of each of the bars being provided with a curved surface. The bar electrode 24 is disposed so that its curved surface faces the shield electrode 20. The remaining pair of bar electrodes 26 and 28 are disposed so that their curved surfaces face bar electrode 24 and the electrode 20. By reason of the electric field established by the electrode system 22, the ions formed at the ionizing surface 12 are caused to follow a path which curves away from the ionizing surface and becomes established around a principal axis which passes between the bar electrode 24 and the pair of bar electrodes 26 and 28 on the other side of the ion beam path.

Disposed beyond the electrode system 22 (with reference to a direction away from the ionizing surface 12) is a plate electrode 30 having an aperture therein through which the principal axis of the ion beam path passes. This electrode 30 serves the functions of further shaping or compressing the ion beam and accelerating the ion beam by means of a suitable potential thereon. In the case of a ribbon-like or flat beam (as opposed to a beam of circular cross-section), a pair of these electrodes, one above the other and in the same plane, may be utilized with a space therebetween through which the ion beam passes.

In operation, and assuming the formation of an aluminum ion beam, for example, a supply of aluminum is placed in the reservoir 6 which is then heated to at least the temperature at which aluminum vaporizes, resulting in the formation of an aluminum atomic beam which impinges on the ionizing surface 12. The ionizing surface (of iridium foil 12, for example) is heated to a temperature of about 2100° K. at which the aluminum atoms become ionized due to the loss of an electron to the ionizing surface. The ion beam is then extracted along a curvilinear path from the ionizing surface 12 by means of the electrode system 22.

With reference to FIGURE 2, typical electrode potentials and equipotential force lines resulting from the electric field established thereby are shown as well as the resultant ion trajectories. The plate electrode 20 is maintained at a reference potential (e.g., "zero" with respect to ground). The potential on the electrode 24 may be —50 kv. with respect to the reference potential while the potentials maintained on the pair of electrodes 26 and 28 may be 50 kv. and 20 kv., respectively, with respect to the reference potential. The result of these potential relationships is the establishment of an electric field at the ionizing surface 12 having a predetermined pattern of equipotential lines as indicated which permits the ion beam to be extracted from the ionizing surface in a path curving away therefrom and ultimately becoming established about a principal axis which is at an angle of other than 90° with respect to the ionizing surface 12.

The electrode system can be extended in a direction at right angles to the plane of the drawing to any length so as to produce an ion beam in the form of a strip, for example, if desired. The ion beam dimension itself is determined by the area of the ionizing surface upon which the atomic vapor is directed. If a finite beam of rectangular cross-section is desired, the electrode system (20, 24, 26 and 28) should be extended well beyond the desired beam dimension in order to minimize "end effects" resulting from fringing electric fields. Ion beams of different shapes, for example, circular, can be formed by employing an ionizing surface of the desired shape.

In addition, and as indicated previously, flat parallel electrodes can be positioned further downstream of the ion beam in order to provide compression control thereof which is especially important for small beams of circular cross-section. These plates also can be used to counteract "end effects" which might tend to cause the beam to expand. Ion beams of about 1 centimeter in width have been extracted by the ion beam apparatus of the invention with up to 50 kev. of energy.

The ion beam apparatus of the invention has been used to produce ion beams of aluminum, gallium and indium in a circular cross-section of about 1 centimeter in diameter with a current of up to 500 microamperes. The apparatus is also suitable for generating ion beams of lithium, sodium, potassium, calcium, rubidium, strontium, cesium, barium, thallium, and lanthanide rare earth elements. In a typical experiment with a gallium ion beam, a silicon target was implanted with gallium ions, the beam being expanded to several inches in diameter or compressed to a spot about 3 millimeters in diameter and scanned horizontally and vertically over an area of about 2 inches with energies up to about 110 kev. While not shown in FIGURE 1, it will be appreciated that the ion beam apparatus of the invention is generally incorporated in any type suitable container adapted to be evacuated. The quality of the vacuum needed is not the same in all cases and depends upon the particular ion beam species being produced. Aluminum, for example, requires a high vacuum (i.e., about $10^{-8}$ torr) in order to prevent oxidation of the aluminum on the ionizer surface since the resulting layer of aluminum oxide would eventually inhibit ionization.

In addition to iridium as the ionizing element 12, materials such as rhenium, osmium and platinum have also been employed. Since there is a critical temperature for optimum ionization and beam current density, platinum, though having the highest work function of these various ionizing materials, has too low a melting point to be operated above the requisite critical temperatures. Hence it is preferred to use iridium which has the next highest work function of those listed.

Referring now to FIGURE 3, a typical apparatus is shown for forming an ion beam and causing the beam to impinge upon and to implant ions if desired in a container 32 which may be of metal, for example, is provided in which is disposed the ion beam source 34 of the invention such as shown in FIGURE 1. The container 32 is adapted to be connected to means 36 for evacuating the container 32 which may be an ion pump, for example. Disposed around the ion beam source 34 is a "cold" wall for facilitating the collection of neutral atoms. This cold wall may be formed by a reservoir 38 which is adapted to be supplied with liquid nitrogen, for example. Further downstream from the ion beam forming source 34 and after the electrode system 22, additional electrodes 40, 40′ and 42, 42′ may be provided so as to achieve compression control of the beam as aforementioned. Continuing downstream with reference to the ion beam source, means 44 are provided for permitting a specimen 46 to be inserted in the container 32 and in the path of the ion beam. The specimen mounting means 44 may comprise any suitable valving and support arrangement from which a specimen 46 may be suspended and inserted in the container as shown. It will be understood that the mounting means 44 includes means for permitting a hermetic seal to be made when a specimen is in position. Disposed between the specimen holder 44 and the compression electrode system 40, 42 are electrostatic deflection plates 48, 48′ disposed on either side of the ion beam so that the beam may be deflected orthogonally to scan the beam across the surface of the specimen 46.

There thus has been described an improved surface ionization beam forming source and apparatus. The apparatus of the invention is particularly characterized by the production of ion beams marked by an absence of neutral atoms. In addition, the apparatus permits an ion beam to be turned or curved while attaining a high degree of parallelism between the ion trajectories of the beam. Furthermore, it is possible to achieve in a very simple manner a change in the species of ions being produced. Finally, it has been shown that an ion beam produced according to the invention can be controlled, that is, deflected and focussed by applying appropriate potentials to appropriate electrode systems forming a part of the apparatus of the invention.

What is claimed is:

1. Surface ionization source apparatus comprising, in combination:

(1) vaporizing means for forming an atomic beam of material to be formed into an ion beam;

(2) an ionization element including an ionizing surface having a high work function whereby atoms in said atomic beam impinging on said ionizing surface are ionized and formed into a beam of ions;

(3) and an electrode system including:

(a) a plate electrode adjacent said ionizing surface adapted to be maintained at a predetermined reference potential;

(b) a first electrode disposed on one side of the path of said ion beam and having a curved surface facing said plate electrode;

(c) and a pair of electrodes disposed on the opposite side of the path of said ion beam from said bar electrode and each having curved surfaces facing said plate electrode and said first electrode;

(4) whereby an electric field is established at said ionizing surface by said electrode system and has a predetermined arrangement of equipotential lines of force for causing said ion beam to follow a preselected path whose principal axis is at an angle of other than 90° with respect to said ionizing surface.

2. The invention according to claim 1 wherein said electrodes are maintained at a potential higher than said reference potential.

3. The invention according to claim 1 wherein said first electrode is maintained at a potential higher than said reference potential and equal to the potential maintained on one of said pair of electrodes and higher than the potential maintained on the other of said pair of electrodes.

4. The invention according to claim 3 wherein said pair of electrodes are disposed in side-by-side fashion with the upstream one of said pair of electrodes being at a higher potential than the potential maintained on the downstream one of said pair of electrodes.

References Cited

UNITED STATES PATENTS

| | | |
|---|---|---|
| 2,576,601 | 11/1951 | Hays. |
| 2,816,231 | 12/1957 | Nygard. |
| 2,836,750 | 5/1958 | Weimer. |
| 3,135,863 | 6/1964 | Hunt. |
| 3,229,157 | 1/1966 | Stevens et al. |
| 3,341,352 | 9/1967 | Ehlers. |

RALPH G. NILSON, Primary Examiner

A. L. BIRCH, Assistant Examiner

U.S. Cl. X.R.

29—25.3; 250—41.9, 49.5; 315—111